United States Patent Office 3,453,887
Patented July 8, 1969

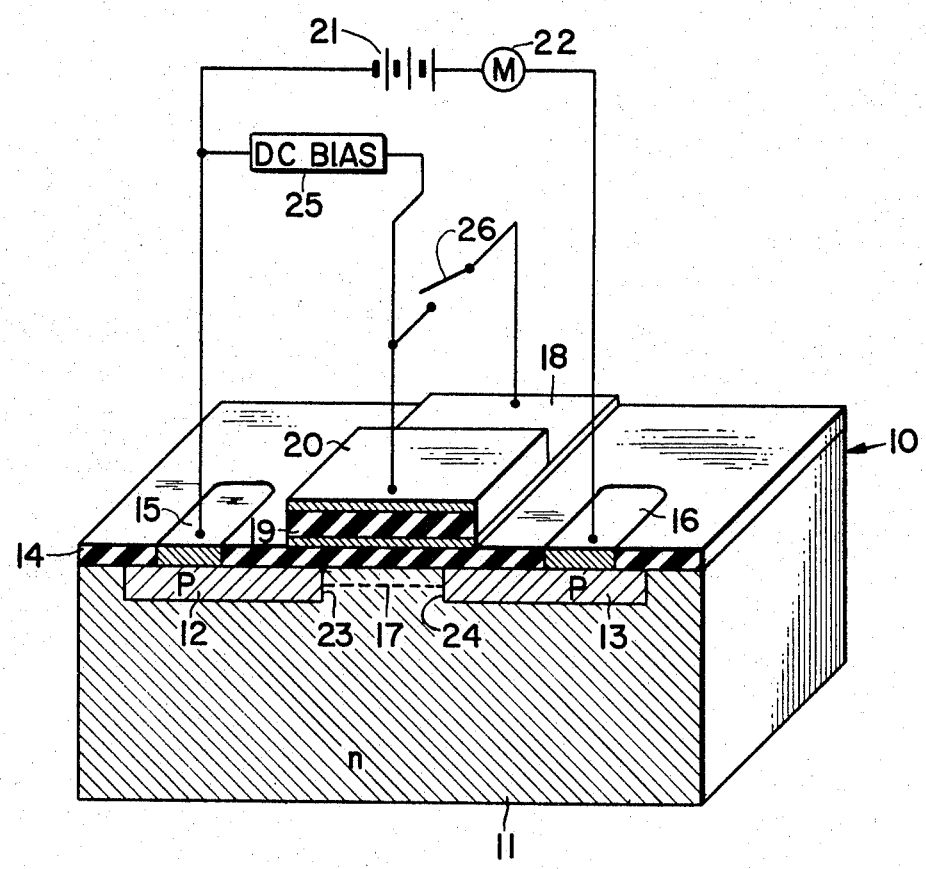

3,453,887
TEMPERATURE CHANGE MEASURING DEVICE
Frank T. Wooten III, Raleigh, N.C., assignor to Corning Glass Works, Corning, N.Y., a corporation of New York
Filed Feb. 8, 1967, Ser. No. 614,599
Int. Cl. G01k *5/18, 5/52, 5/72*
U.S. Cl. 73—362    7 Claims

ABSTRACT OF THE DISCLOSURE

A temperature change measuring device having a metal oxide semiconductor field effect transistor with a wafer of pyroelectric material directly mounted on the gate electrode. A charge produced in the pyroelectric material due to a change in temperature controls the transistor drain current. A simple ammeter connected between the transistor source and drain electrodes may be used to determine a change in temperature.

---

Pyroelectricity is the appearance of positive and negative polarization charges on certain crystals when the temperature of the crystal is changed. Although temperature sensing devices based on this phenomenon produce a relatively high voltage as compared with other temperature sensing devices such as thermocouples, the measurement of this voltage is very difficult since the amount of charge produced is minute. Very high impedance measuring instruments are required to measure this voltage since the pyroelectric material becomes electrically neutral when the charge is removed. Where extremely accurate measurements are required such as in calorimetry, an electrostatic instrument such as the Hoffman electrometer cannot be used since some of the charge leaks from the pyroelectric material before an accurate measurement can be made. Instruments which provide sufficient sensitivity require large crystals and expensive charge detectors.

It is therefore an object of this invention to provide a high sensitivity, inexpensive, miniature temperature change detector.

The ultra-sensitive temperature sensor of this invention utilizes a pyroelectric effect material in combination with a field effect transistor. The device operates as a conventional metal oxide semiconductor (MOS) field effect transistor except that the gate charge is supplied by a wafer of pyroelectric material. Since the MOS transistor has a very high input impedance, a requirement necessary for detecting the charge on pyroelectric material, only a simple current detector is required as the final detector.

Other objects, advantages and features will become apparent form consideration of the following description when taken in conjunction with the drawing wherein the sole figure is a perspective view partially in cross section of a preferred embodiment of this invention.

The temperature-change sensor shown in the figure consists of a conventional field effect transistor 10 on which a wafer of pyroelectric material is mounted. The field effect transistor, as is well known in the art, may consist of a substrate 11 of n-type conductivity having spaced surface portions 12 and 13 which are heavily doped regions of p-type conductivity. NPN devices may also be used. An oxide coating 14 covers the surface of the substrate which contains the surface portions 12 and 13. Ohmic contacts 15 and 16 are connected to the surface portions 12 and 13 respectively. A thin conduction channel, which is represented by the dashed line 17, exists at the surface of the substrate 11 between the portions 12 and 13. An electrode 18 contacts a portion of the oxide coating 14 opposite the channnel 17. A wafer of pyroelectric material 19 is located on the electrode 18, and an electrode 20 is located on the surface of the wafer 19. The pyroelectric wafer is cut so that the direction of polarization is normal to the flat surfaces thereof. A battery 21 and a meter 22 are serially connected between the contacts 12 and 13. The polarity of the battery reverse biases a p-n junction 23 which partially surrounds the surface portion 12 and forward biases a p-n junction 24 which partially surrounds the surface portion 13. A D.C. bias source 25 may be connected between the contact 15 and the electrode 20 if it is desired to operate at a quiescent point other than zero voltage. A switch 26 is connected between the electrodes 18 and 19.

It is well known that in response to an accumulation of charge of one polarity on the electrode 18 a charge of opposite polarity is induced in the surface portion of the wafer 11 in the vicinity of the conducting channel 17. The flow of drain current in the transistor is thereby controlled by changes in the voltage appearing at the electrode 18. Since the wafer 19 of pyroelectric material is placed over the electrode 18, changes in temperature of the pyroelectric material will produce changes in the voltage on the electrode 18. This will produce changes in the drain current which can be detected by conventional methods such as an ammeter 22.

The following simple analysis permits the sensitivity of the hereinabove described device to be determined. For a pyroelectric material, a change in charge Q is described by $$\Delta Q = pA(\Delta T) \qquad (1)$$

where $p$ is the pyroelectric coefficient in coulombs/cm.$^2$ ° C., A is the area in cm.$^2$ and $\Delta T$ is the change in temperature in ° C. Considering the pyroelectric material 19 and the electrodes 18 and 20 as a parallel plate capacitor the following equation may be written $$\Delta Q = \frac{\epsilon A}{d} \Delta V \qquad (2)$$

where $\epsilon$ is the dielectric constant, $d$ is the plate spacing and $\Delta V$ is the change in voltage. Combining Equations 1 and 2 results in $$\Delta V / \Delta T = pd/\epsilon \qquad (3)$$

It is interesting to note that area is not a factor in this relation so that sensor miniaturization is limited only by the transistor size. If the transistor transconductance $g_m$ is substituted into the relationship in Equation 3, the following equation results:

$$\Delta I_d / \Delta T = pdg_m/\epsilon \qquad (4)$$

where $I_d$ is the drain current. Barium titanate is one of the most suitable pyroelectric materials since it is spontaneously polarized at room temperature, and its curve of pyroelectric coefficients versus temperature is almost linear between −25° C. and 100° C. Therefore, assuming that a silicon MOS transistor is utilized having a barium titanate pyroelectric material disposed over the gate electrode thereof, the following values may be assumed: $p = 2 \times 10^{-8}$ coulombs/cm.$^2$ ° C., $g_m = 8000$ micromhos, and $d = 0.1$ cm. Substituting these values into Equation 4 yields the following:

$$\Delta I_d / \Delta T = 0.15 \text{ amperes/° C.}$$

Assuming a current detection ability of 1 microamp, a temperature change of $6.6 \times 10^{-6}$ ° C. can be detected. The temperature range of such a sensor would be limited by the leakage current of the MOS transistor and the Curie point of the pyroelectric material.

Because of the extremely high sensitivity of such a sensor, only small changes in temperature should be measured. Therefore, the pyroelectric material should be kept shorted by the switch 26 until a measurement is desired. Temperature sensitivity could be reduced by using a transistor with a lower tranconductance and by reducing the thickness of the pyroelectric material. Although barium titanate is a preferred pyroelectric material for use within the temperature range of −25° C. to 100° C., it becomes unsuitable for temperature-change measurements above 100° C.; and other materials must then be used. Some other pyroelectric materials which can be used in a temperature-change sensor are Rochelle salt, wurtzite, and pentaterythritol.

A highly sensitive, extremely small temperature-change detector can be constructed in accordance with this invention. A MOS transistor can be easily built in an area of $10^{-3}$ square inches. Sensitivity is not affected by the pyroelectric material area, so an extremely small device can be built. Since the MOS transistor has a very high input impedance, only a simple current detector is required as the final detector.

What is claimed is:

1. A temperature change measuring device comprising
a field effect semiconductor device comprising a substrate of a first type conductivity material having spaced surface portions, the conductivity of said spaced surface portions being opposite said first type conductivity, a conduction channel extending between said surface portions, the conduction thereof being related to the strength of an applied electric field which traverses said channel, and first and second ohmic contacts in contact with said first and second surface portions respectively,
pyroelectric means mounted adjacent said conduction channel for generating an electric field in response to a change in the temperature thereof, means for selectively reducing said field to zero so that the change in electric field is thereafter related to the change in temperature of said pyroelectric means so that the change in current conduction of said channel is a function of the amount of temperature change, and
means connected between said first and second ohmic contacts for displaying the amplitude of the current flowing in said conduction channel.

2. A temperature change measuring device comprising
a field effect semiconductor device comprising a substrate of a first type conductivity material having spaced surface portions, the conductivity of said spaced surface portions being opposite said first type conductivity, a conduction channel extending between said surface portions, the conduction thereof being related to the strength of an applied electric field which traverses said channel, first and second ohmic contacts in contact with said first and second surface portions respectively,
a dielectric coating overlaying the portion of said semiconductor surface in which said conduction channel is contained,
a first electrode disposed on said dielectric coating,
a pyroelectric wafer, one side of which contacts said first electrode, said pyroelectric wafer generating an electric field in response to a change in the temperature thereof, means for selectively reducing said field to zero so that the change in electric field is thereafter related to the change in temperature of said pyroelectric wafer so that the change in current conduction of said channnel is a function of the amount of temperature change,
a second electrode in contact with said pyroelectric wafer on the side thereof opposite said first side, and
conductive means connecting said second electrode to said first ohmic contact.

3. A temperature measuring device in accordance with claim 2 which further includes a switch connected between said first and second electrodes.

4. A temperature change measuring device comprising
a semiconductor substrate of a first conductivity type of material having first and second spaced surface portions, the conductivity of which is opposite that of said first conductivity type material, a conductive channel being formed between said first and second surface portions,
a dielectric coating over at least said conductive channel portion of said substrate,
first and second ohmic contacts to said first and second surface portions, respectively,
a first electrode along said dielectric coating,
a wafer of pyroelectric material on said first electrode,
a second electrode on said pyroelectric wafer opposite said first electrode,
means for selectively short circuiting said first and second electrodes,
means for impressing a voltage across said first and second ohmic contacts, and
conductive means for connecting said first ohmic contact to said second electrode.

5. A temperature measuring device in accordance with claim 4 which further includes switch means connected between said first and second electrodes.

6. A temperature measuring device in accordance with claim 5 which further includes means to measure the current flowing between said first and second surface portions.

7. A temperature measuring device in accordance with claim 5 wherein said conductive means comprises a D.C. bias source.

References Cited

UNITED STATES PATENTS

| | | | |
|---|---|---|---|
| 3,287,506 | 11/1966 | Hähnlein. | |
| 3,374,406 | 3/1968 | Wallmark | 317—235 |
| 3,234,413 | 2/1966 | Howatt et al. | 73—359 XR |
| 3,294,988 | 12/1966 | Packard | 307—304 |

LOUIS R. PRINCE, *Primary Examiner.*

FREDERICK SHOON, *Assistant Examiner.*

U.S. Cl. X.R.

307—304, 310; 317—235